(12) United States Patent
Sathianathan

(10) Patent No.: US 8,295,345 B2
(45) Date of Patent: Oct. 23, 2012

(54) TRANSCODER UNIT AND METHOD

(75) Inventor: Brainerd Sathianathan, San Jose, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 1026 days.

(21) Appl. No.: 12/235,118

(22) Filed: Sep. 22, 2008

(65) Prior Publication Data

US 2010/0074326 A1    Mar. 25, 2010

(51) Int. Cl.
 *H04N 7/50*    (2006.01)
(52) U.S. Cl. .............................. 375/240.03; 375/E7.198
(58) Field of Classification Search .................. 375/240, 375/242, 240.2, 240.02, 240.05, 240.18, 375/E7.198, E7.211, E7.216, E7.226, E7.255, 375/E7.256
 See application file for complete search history.

(56) References Cited

U.S. PATENT DOCUMENTS

| 7,505,480 B1 * | 3/2009 | Zhang et al. ................. 370/465 |
| 2005/0025053 A1 | 2/2005 | Izzat |
| 2006/0018378 A1 | 1/2006 | Piccinelli |
| 2006/0109900 A1 * | 5/2006 | Shen ........................ 375/240.03 |
| 2008/0219356 A1 | 9/2008 | Johar |

FOREIGN PATENT DOCUMENTS

| EP | 1 580 914 | 9/2005 |
| KR | 10-2007-0081949 | 8/2007 |
| KR | 10-2008-0055820 | 6/2008 |

OTHER PUBLICATIONS

Muntean, et al "Adaptive Pre-Recorded Multimedia Streaming", GLOBECOM'02. 2002-IEEE Global Telecommunications Conference. Conference Proceedings. Taipei, Taiwan, Nov. 17-21, 2002; New York, NY: IEEE, US, vol. 2, Nov. 17, 2002, pp. 1728-1732.

Liu, et al "Joint Temporal-Spatial Rate Control for Adaptive Video Transcoding", Proceedings of the 2003 International Conference on Multimedia and Expo: Jul. 6-9, 2003, Baltimore Marriott Waterfront Hotel, Baltimore, Maryland, USA, IEEE Operations Center, US, vol. 2, Jul. 6, 2003, pp. 225-228.

* cited by examiner

*Primary Examiner* — Gilberto Barron, Jr.
*Assistant Examiner* — Izunna Okeke
(74) *Attorney, Agent, or Firm* — Farjami & Farjami LLP

(57) ABSTRACT

A transcoder is provided that achieves lower complexity without picture quality loss. The transcoder may be either an open loop transcoder or a closed loop transcoder.

8 Claims, 4 Drawing Sheets

TRANSCODER UNIT AND METHOD

FIELD

The unit and method relate generally to converting compressed video from one format to another different format.

BACKGROUND

The process of transcoding converts a compressed video from one format into another compressed video with a different format. The traditional approach is to perform transcoding in the pixel domain referred to as the cascaded pixel domain approach. This traditional approach involves decoding the original signal, perform the intermediate processing, and fully re-encoding the processed signal subject to any new constraints. This traditional transcoding is very costly (from a computing resources stand-point and a length of time standpoint) to do. Thus, the major area of research in transcoding now focuses on increasing the efficiency, i.e. decreasing the computational time. However, any gains in efficiency should have a minimal impact on the quality of the transcoded video.

Thus, it is desirable to achieve bit rate reduction using low-complexity, faster transcoding methods and it is to this end that the unit and method are directed.

DETAILED DESCRIPTION OF ONE OR MORE EMBODIMENTS

The unit and method are particularly applicable to transcoding compressed digital video data and it is in this context that the unit and method will be described. It will be appreciated, however, that the unit and method has greater utility since it can also be used to transcode other types of digital data or other compressed bitstreams and may be implemented differently than the example shown in the diagrams and described below, and these different uses of the transcoding and the different implementations are within the scope of the disclosure.

Figure 1:
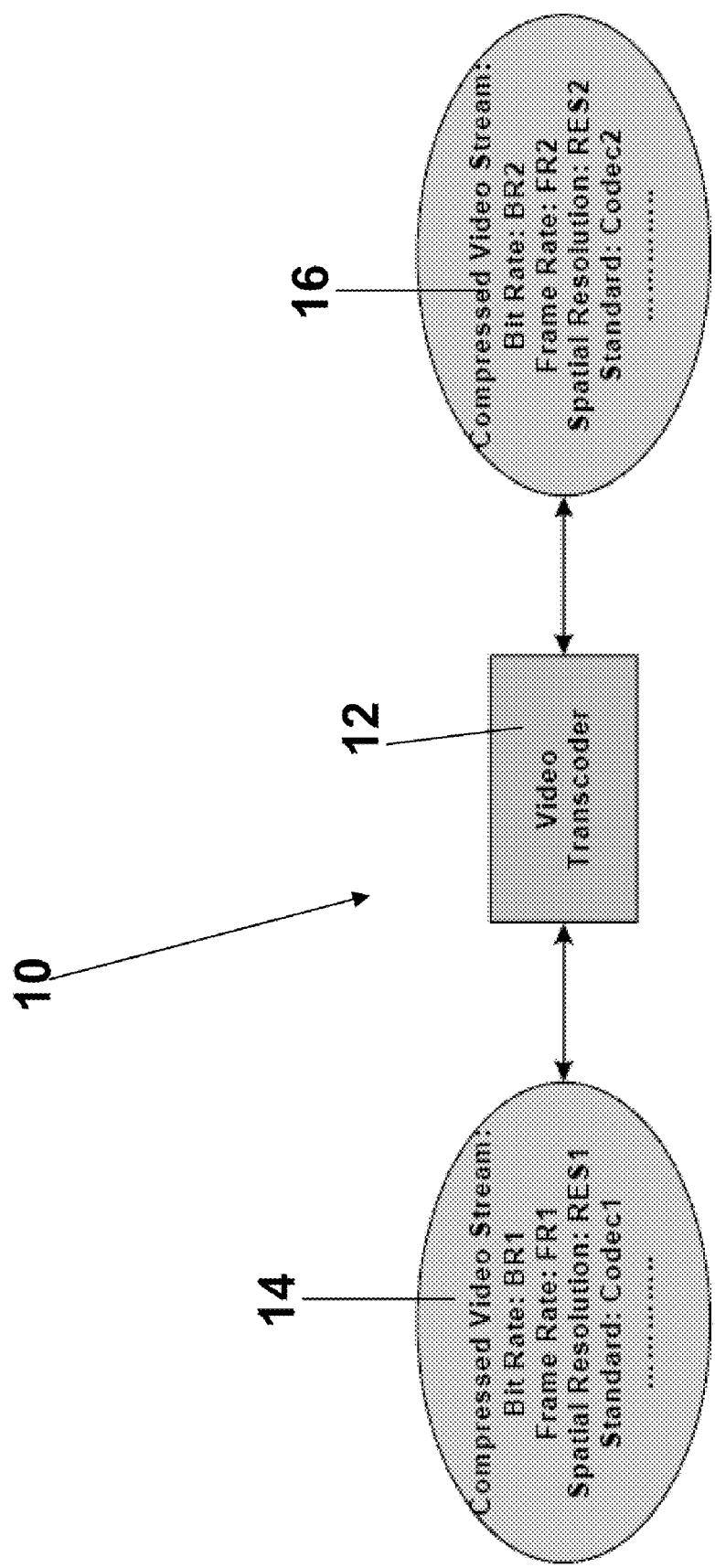
FIG. 1 illustrates a transcoding process.

FIG. 1 illustrates a transcoding process 10 in which a transcoder 12, such as the video transcoder shown that may be implemented in software, hardware or a combination of hardware and software, may be used to convert a first compressed bit stream 14 into a second compressed bit stream 16. The first compressed bit stream may have a bit rate BR1, a frame rate FR1, a spatial resolution RES1 and be encoded using a standard Codec1. Once the compressed bit stream passes through the transcoder 12, it is converted into the second compressed bit stream that has bit rate BR2, a frame rate FR2, a spatial resolution RES2 and be encoded using a standard Codec2 wherein each of these parameters may be different from the parameters of the first compressed bit stream. Now, a two implementations of a transcoder that achieves bit rate reduction using low-complexity, faster transcoding methods that result in the highest possible quality of video are described. In particular, an open loop low-complexity, faster transcoder implementation and a closed loop low-complexity, faster transcoder implementation are described.

Figure 2:
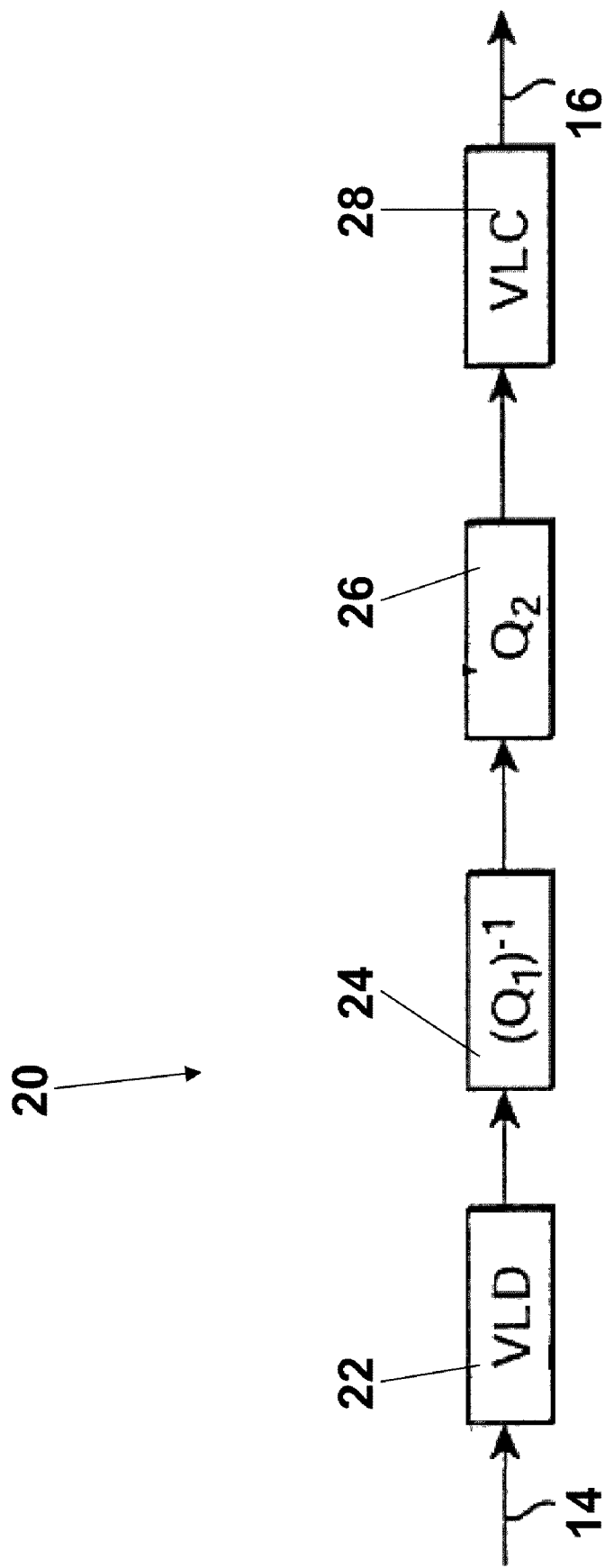
FIG. 2 illustrates an open loop transcoding process.

FIG. 2 illustrates an open loop transcoding process 20 that is low-complexity and faster than typical transcoders. The primary goal of the open-loop transcoder is to modify the output bit-rate through quantization adjustments directly on the transform domain. In the open loop process shown, the first compressed bit stream 14 is variable length decoded using a variable length decoder unit/module 22 which results in quantized coefficients (whether a DCT process or other transform process is used). The current transcoder technique is applicable for most block-based and transform based video compression standards. This transcoder architecture can be extended to many other transforms including wavelets. The quantized coefficients are inverse quantized using an inverse quantizer module/unit 24 which results in a set of coefficients which are then re-quantized with a quantizer unit/module 26 that has a different quantization level (so that it has a different bit rate) to generate the second compressed bit stream with the new output bit rate. Then, the re-quantized coefficients are variable length coded using a variable length coder unit/module 28 which results in the second compressed bit stream 16. In this open loop transcoding, the original motion vectors and video frame headers are preserved and re-used without any modification. However, the macroblock headers are re-evaluated. This is done due to the change of quantization open loop transcoder does not require a frame memory (since no motion estimation is performed) and, since no motion estimation is performed, there is no need for a IDCT or DCT process unit. The open-loop transcoder may be subject to drift effect caused by the change in quantization.

Figure 3:
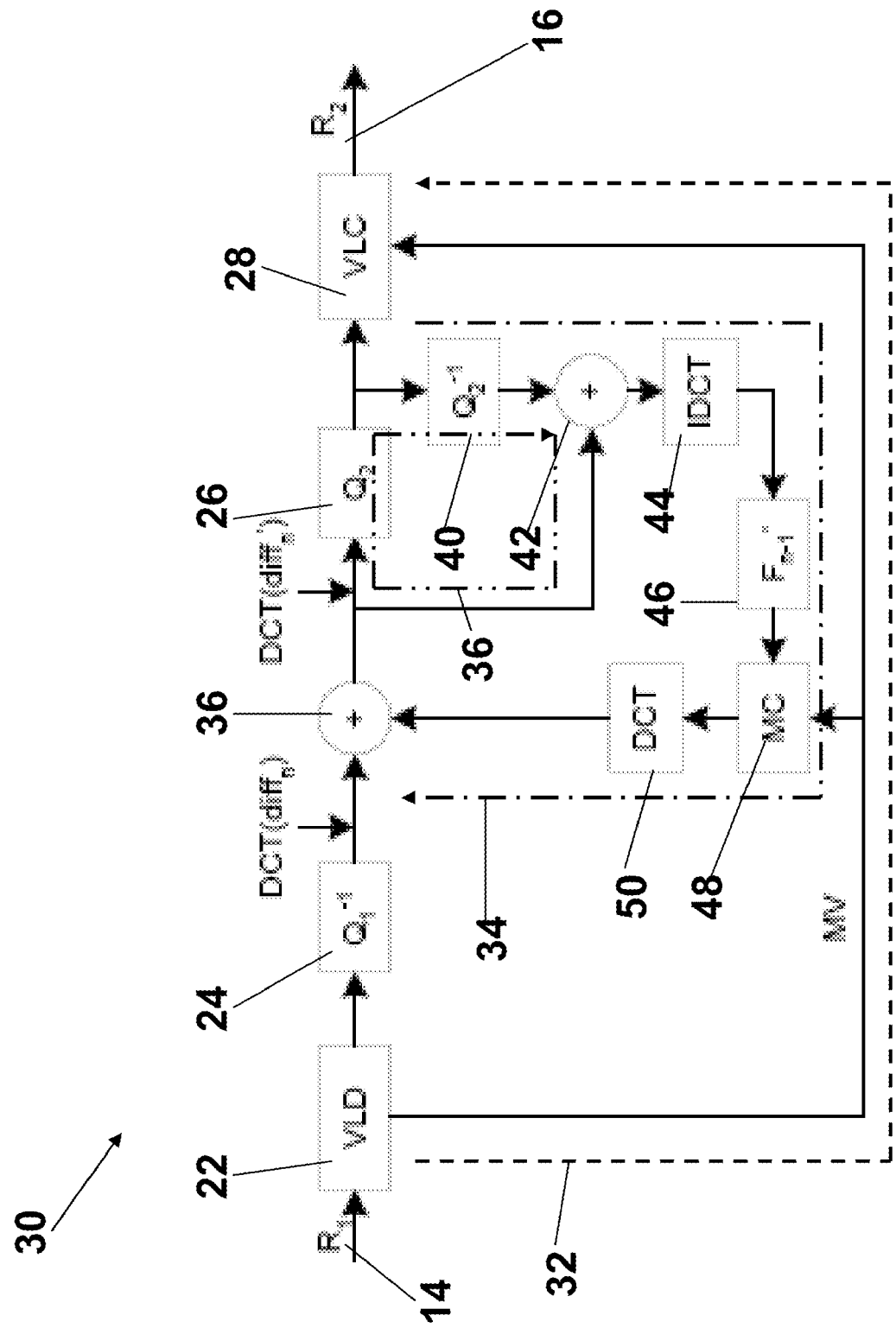
FIG. 3 illustrates a closed loop transcoding process.

FIG. 3 illustrates a closed loop transcoding process 30 that is low-complexity and faster than typical transcoders. The closed-loop system aims to eliminate the mismatch between predictive and residual components by approximating the cascading decoder-encoder architecture. The closed loop transcoder may use a data re-use scheme or a fast pixel domain transcoder. The closed loop transcoder 30, which may be a DCT domain transcoder with hybrid loop in one embodiment, may use the same VLD unit 22, inverse quantizer unit 24, quantizer 26 that quantizes at a second different quantization level and VLC unit 28 that may be implemented in the same manner as the open loop transcoder and may perform the same functions and operations as described above.

The closed loop transcoder 30 may decode the variable length coding using the VLD unit 22, inverse quantize the output of the VLD using the inverse quantizer 24 which results in a stream of coefficients. The stream of coefficients may then be combined with frame motion compensation changes by a combiner unit 36 and the resultant signal is quantized by the quantizer 26, combined with any motion vectors and variable length coded by the VLC unit 28 to generate the second compressed bit stream 16. The closed loop transcoder 30 may implement, using a number of components, a first transcoder loop 32, a second transcoder loop 34 and a third transcoder loop 36 as shown by the dotted lines in FIG. 3. The first transcoder loop 32 may include the VLD and VLC units 22, 28 and operate to communicate the motion vector information (for a well known MPEG or h.263 P frame) in the first compressed bit stream 14 R1 from the VLD unit 22 to the VLC unit 28 so that, without recalculating the motion vector during the transcoding, so that the motion vector can be inserted back into the second compressed bit stream 16 (and avoid motion estimation) before it is variable length coded.

The second transcoder loop 34 may perform motion compensation between on each frame of data wherein the quantized coefficients output from quantizer 26 are inverse quantized using an inverse quantizer unit 40 to generate coefficients, summed together with unquantized coefficients output from the summer 36 to generate a coefficient stream. The coefficient stream may have an inverse DCT process performed using an inverse DCT unit 44 to generate uncompressed video data that is compared to a prior frame ($F_{n-1}$) using a unit 46 and a motion compensation unit 48 to generate new motion compensated frames. The new motion compensated frame have discrete cosine transforms performed by a DCT unit 50 and a stream of DCT coefficients for the new motion compensated frame are fed into the summer unit 36 to perform motion compensation between frames.

The third transcoder loop 36 may remove drift caused by any bit rate change (such as the bit rate change caused by quantizer 26) by summing the original coefficients to the second quanitzer coefficients during the motion compensation. Thus, this closed loop transcoder performs transcoding with minimal DCT/IDCT conversions.

Figure 4:
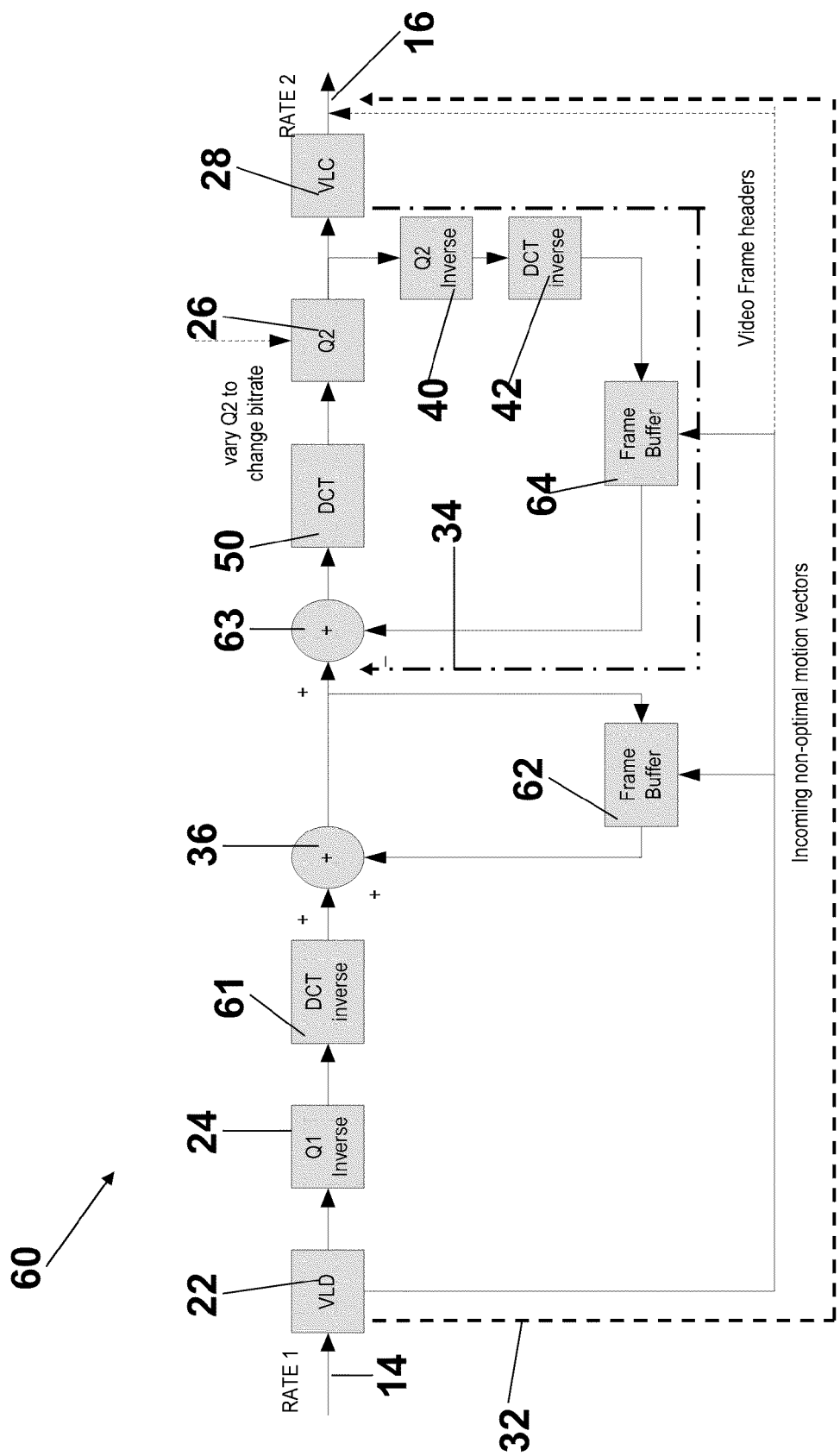
FIG. 4 illustrates a closed loop transcoding process without motion estimation.

FIG. 4 illustrates a closed loop transcoding process 60 without motion estimation that shares many of the same components of the closed loop transcoder shown in FIG. 3. As with the transcoder shown in FIG. 3, this transcoder 60 has the first and second transcoder loops 32, 34 that perform the same operations as described above. The transcoder 60 may decode the variable length coding using the VLD unit 22, inverse quantize the output of the VLD using the inverse quantizer 24 which results in a stream of coefficients which are converted back into video data values using an inverse DCT unit 61. Then, the video data values are summed by the summer unit 36 with a prior frame of video data stored in a first frame buffer 62 as shown. Then, the sum of the two frames of video data is summed using a summer unit 63 with the output of the second transcoder loop 34 that performs motion compensation for each frame (and removes drift caused by varying the bit rate by varying the quantization level of Q2).

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A transcoder for transcoding a first compressed bit stream having a first bit rate to a second compressed bit stream having a second bit rate, the transcoder comprising:
   a receiver configured to receive the first compressed bit stream having the first bit rate, a motion vector and video frame headers;
   an inverse quantizer configured to receive the first compressed bit stream and generate, based on the first bit rate corresponding to a first quantization level, a stream of coefficients;
   a transcoder loop configured to perform inter-frame motion compensation based on the stream of coefficients from the first compressed bit stream and a stream of coefficients from a previous frame of the first compressed bit stream;
   a quantizer configured to quantize the stream of coefficients at a second quantization level based on the inter-frame motion compensation to generate a stream of coefficients at the second quantization level; and
   wherein the transcoder is configured to generate, based on the stream of coefficients at the second quantization level, the second compressed bit stream having the second bit rate, and wherein the second compressed bit stream includes the motion vector without modification and the video frame headers without modification.

2. The transcoder of claim 1, wherein the transcoder further comprises a variable length decoder that generates a first variable length decoded bit stream feeding into the inverse quantizer.

3. The transcoder of claim 2, wherein the transcoder further comprises a variable length coder that, based on the stream of coefficients at the second quantization level, generates the second bit stream having the second bit rate.

4. The transcoder of claim 1, wherein each coefficient further comprises a discrete transform coefficient.

5. A method of transcoding a first compressed bit stream having a first bit rate to a second compressed bit stream having a second bit rate, the method comprising:
   receiving the first compressed bit stream having the first bit rate, a motion vector and video frame headers;
   generating, using an inverse quantizer, a stream of coefficients from the first compressed bit stream based on the first bit rate corresponding to a first quantization level;
   using a transcoder loop to perform inter-frame motion compensation based on the stream of coefficients from the first compressed bit stream and a stream of coefficients from a previous frame of the first compressed bit stream;
   quantizing the stream of coefficients at a second quantization level based on the inter-frame motion compensation to generate a stream of coefficients at the second quantization level; and
   generating, based on the stream of coefficients at the second quantization level, the second compressed bit stream having the second bit rate, and wherein the second compressed bit stream includes the motion vector without modification and the video frame headers without modification.

6. The method of claim 5 further comprising generating, using a variable length decoder, a first variable length decoded bit stream feeding into the inverse quantizer.

7. The method of claim 6 further comprising generating, using a variable length coder, the second bit stream having the second bit rate based on the stream of coefficients at the second quantization level.

8. The method of claim 5, wherein each coefficient further comprises a discrete transform coefficient.

* * * * *